United States Patent [19]

Genfan

[11] Patent Number: 4,964,357
[45] Date of Patent: Oct. 23, 1990

[54] PLANING BOAT
[75] Inventor: German S. Genfan, Worcester, Mass.
[73] Assignee: James T. Merchant, Worcester, Mass.
[21] Appl. No.: 362,080
[22] Filed: Jun. 6, 1989
[51] Int. Cl.[5] .......................... B63B 1/22; B63B 1/32; B63B 43/14
[52] U.S. Cl. .................... 114/274; 114/123; 114/283; 114/284; 440/63
[58] Field of Search .............. 114/274, 283, 284, 271, 114/123, 61; 440/63

[56] References Cited

U.S. PATENT DOCUMENTS

| | | | |
|---|---|---|---|
| 2,817,101 | 12/1957 | Chaffee | 114/271 |
| 2,918,029 | 12/1959 | Legat | 114/283 |
| 3,136,288 | 6/1964 | Hardy | 440/63 |
| 3,702,106 | 11/1972 | Wilder | 114/123 |
| 3,827,391 | 8/1974 | Stanberry et al. | 114/274 |
| 3,964,417 | 6/1976 | Williams et al. | 114/274 |
| 3,983,834 | 10/1976 | Hirmann | 440/63 |
| 4,320,713 | 3/1982 | Nishida et al. | 114/123 |
| 4,494,472 | 1/1985 | Rougerie | 114/123 |
| 4,685,641 | 8/1987 | Kirsh et al. | 114/283 |
| 4,712,630 | 12/1987 | Blum | 114/283 |

Primary Examiner—David H. Brown

[57] ABSTRACT

A boat comprising a tube-like hull (1), a hydrofoil (2) fixed to its front portion, a pair of wings (4) hinged to each side of its rear portion, a fin (20) fixed to its rear bottom portion, an out-board-type motor (9) provided in its center of gravity, and a steering lever (14) that can be rotated and also tilted. Rotation of the lever (14) causing rotation of the motor (9) and steering the boat. Tilting the lever causing lifting or lowering the wings (4). Each wing (4) has a float (5) fixed to its end. When the boat stops and at low speed the floats are in the water. When the boat at high speed an operator gives lift to the floats out of the water. At highest speed an operator puts the wings in parallel with the water surface and a ground effect is used. Central location of the motor contributes the boat to go into hydroplaning at low speed and gives lift to the rear portion of the boat using water pressure created by a propeller. The most controlable boating and efficient usage of motor power are provided.

6 Claims, 3 Drawing Sheets

PLANING BOAT

FIELD OF INVENTION

The invention herein presented relates to a high speed planing boat of the type having a hydrofoil for speeding the boat and two side floats to impart the boat a lateral stability.

BACKGROUND OF THE INVENTION

Conventional high speed hydrofoil planing boats are typically comprised of a hull having a sophisticated shape to impart to the boat a lateral stability at low speed and when it stops, to provide less tractive resistance at high speed and hydroplaning. A propeller to move the conventional boat is typically located at the rear portion of the hull. The aerodynamic stabilizers are usually permanently mounted on the superstructure of the boat.

The sophisticated shape of a conventional boat hull leads to a higher cost of the boat. The conventional usage of the side floats causes a higher boat tractive resistance on high speed permanent conventional aerodynamic stabilizers impart a boat an additional weight and are useless at low speed and when it stops and cause less buoyancy and acceleration, and subsequently it is more difficult to go into planing. The rear location of the propeller does not give the possibility to utilize water pressure behind the propeller to raise the boat a little thus providing less tractive resistance. Conventional propeller location does not practically contribute for the boat to go into hydroplaning on low speed because conventional design does not utilize a torque generated by a propeller along the boat.

It is desirable for the boat's hull to have a simple shape with small tractive resistance. It is also desirable for the aerodynamic stabilizers not to impart the boat an extra weight at low speed and when it stops. It is desirable as well to utilize water pressure and a longitudinal torque generated by a propeller for raising the boat a little and accelerating it to go into hydroplaning.

SUMMARY OF THE INVENTION

The invention herein presented is provided with a tube-like hull and side floats each being fixed to the wing-like plate composing a wing-float structure, said structure being hinged to said hull and being kinematically connected with a steering lever for lifting and lowering said wing-float structure, said steering lever being also kinematically connected with a propeller housing for rotating said housing with said propeller around a vertical axis arranged in a plane which is in line with a full-loaded boat center of gravity.

The wing-float structures according to the presented invention might be lowered and dipped into the water for low speed/stop stability!! They also might be raised out of the water into upper position during a boat acceleration. They also might be placed into horizontal position causing the so-called screen-effect during maximum boat speed!! The above mentioned structures impart a boat lateral stability at low speed and when it stops and increases the boat acceleration and its maximum speed!! Being out of the water, the mentioned structures act as aerodynamic stabilizers, being in the water, they act as hydrodynamic stabilizers additionally increasing the boat buoyancy. A propeller location in line with the center of gravity of a boat and in front of the inclined front plane of the rear portion of the boat contributes to the maximum usage of the water pressure created by the propeller and of the propeller's torque along the boat causing it to go into hydroplaning at lower speed. Hinged wing-float structures allow the possibiliyt of using a simply shaped, low-cost hull for speedboats.

Compared with a traditional planing boat, the present invention provides the operator much more controllable boating that will be more interesting. According to the invention, the boat can attain twice the speed as a conventional one with equivalent power.

DRAWINGS

DETAILED DESCRIPTION

Figure 1:
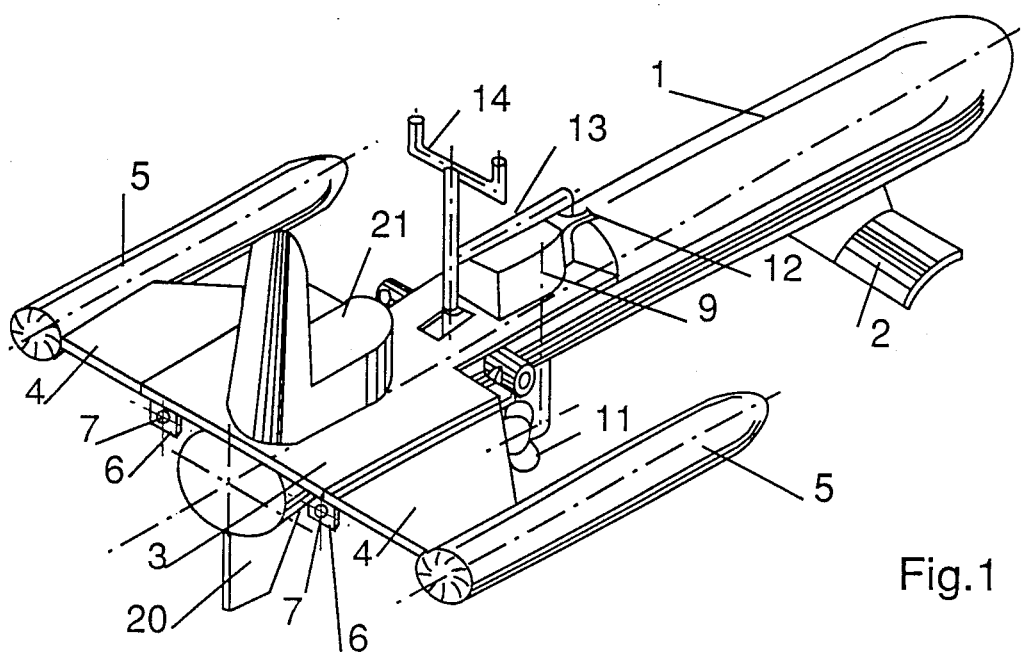
FIG. 1 is an isometric view of the planing boat according to the presented invention.
Figure 2:
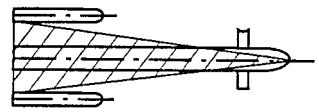
FIG. 2 is a small scale top view of the boat showing its support area when at low speed stopped (floats are in water)
Figure 3:
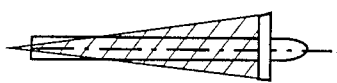
FIG. 3 is the same view as FIG. 2 but showing the boat's support area when at high speed (floats are out of water)

Referring to the drawings, FIG. 1 shows a planing boat having a tube-like hull 1 with a hydrofoil 2 fixed on its front portion and with a deck 3 fixed on its rear portion in the hull's 1 cutout. The deck 3 on each side is pivotally connected with a wing 4 having a tube-like float 5 fixedly secured on the free end of the wing 4. Mentioned pivot connection is realized by means of at least two bearings 6 fixed on the deck 3 and by means of a shaft 7 on which the wing 4 is fixed. The shaft 7 might be rotated in the bearings 6.

Figure 4:
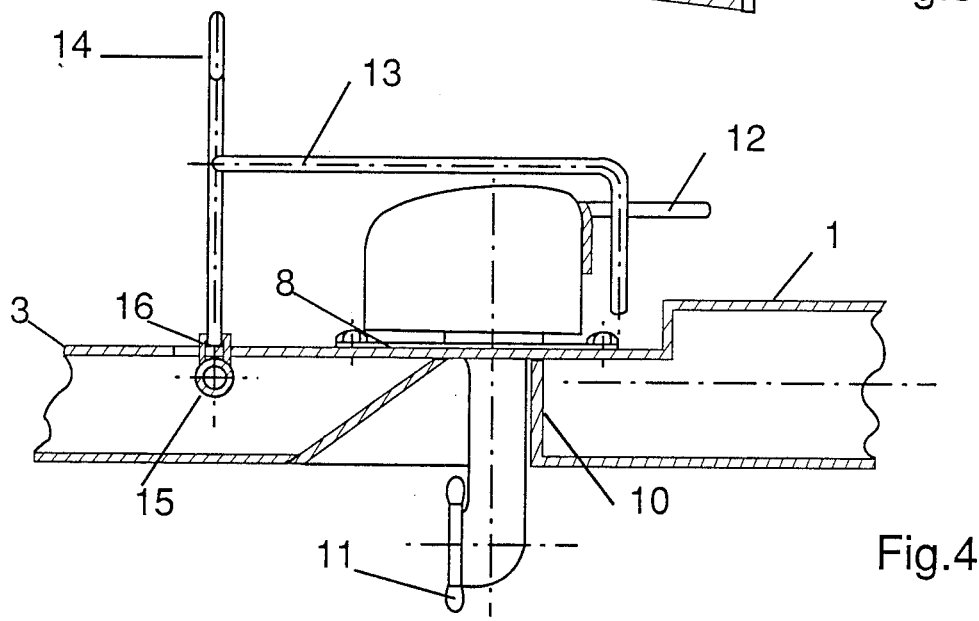
FIG. 4 is a longitudinal sectional view of the boat portion with the motor and the steering lever.

To the deck 3 is secured a mounting base 8 (see FIG. 4) for an outboard type motor 9. The base 8 is a bearing support for the motor 9 to rotate it around a vertical axis. This vertical axis should be arranged in a plane which is in line with a full-loaded boat center of gravity. There is a vertical water-tight tube 10 fixed in the center of the hull 1 to provide the possibility for the motor's gearbox to go through the hull 1 to a propeller 11. Back wall of the tube 10 has an inclination, as shown in FIG. 4.

Secured on the motor 9 is a fork 12 interconnected with an arm 13 which, in turn, is fixed on a steering lever 14. Under the deck 3 there is a tube 15 which can be rotated around its horizontal axis. In the tube 15 there is a bearing support 16 in which the lever 14 can be rotated around its longitudinal axis. So, the lever 14 might be rotated in a bearing support fixed on the wall of the tube 15 and also might be tilted together with this support causing rotation of the tube 15 around its longitudinal axis. By the lever 14 an arm 13 and a fork 12 can be rotated causing the rotation of the motor 9 housing with a gearbox and a propeller 11 around the vertical axis of the whole motor 9 unit in the same direction as the lever 14. If the lever 14 is rotating clockwise this will cause the whole motor 9 unit to rotate clockwise as well.

Figure 5:
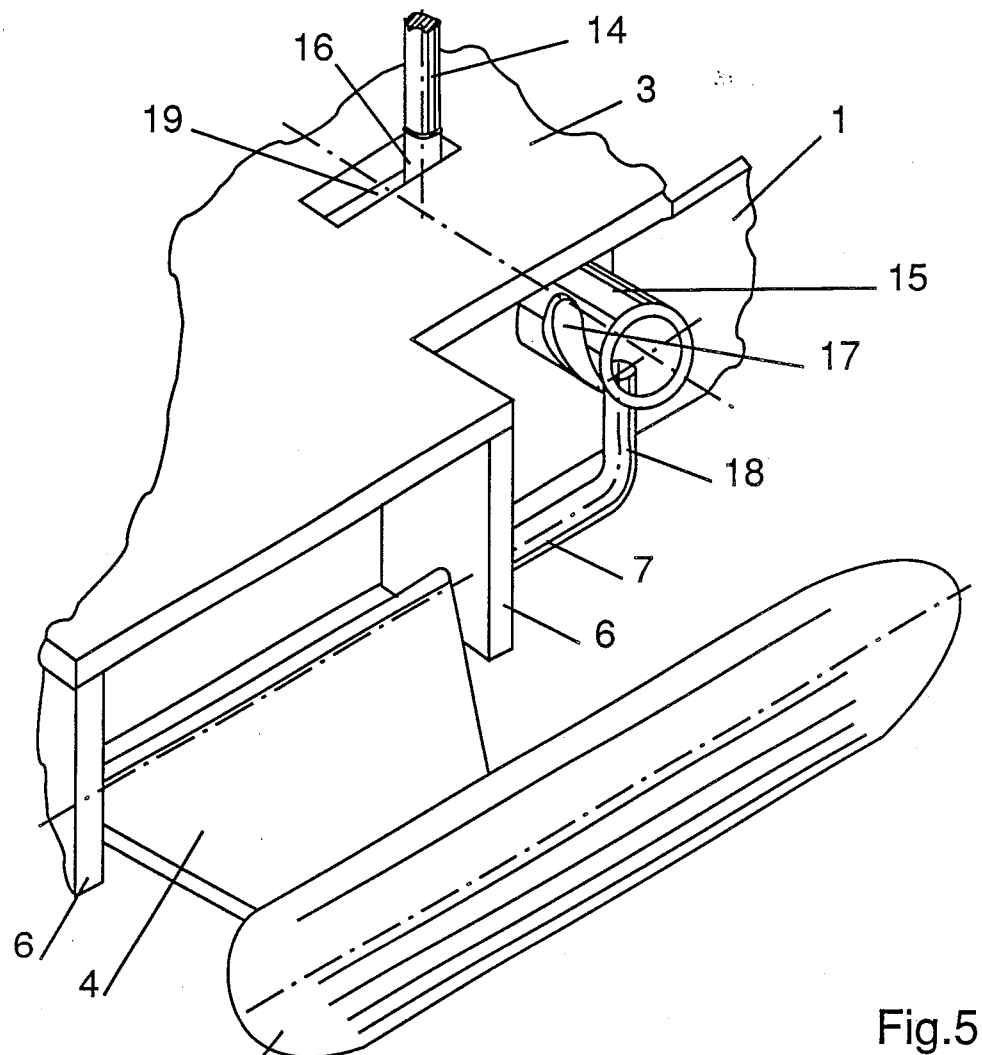
FIG. 5 is an isometric view of the boat portion with a wing-float structure and its lifting mechanism.

The tube 15 on each end has in its wall an opening 17 (see FIG. 5) which spirals onto the center of this tube. Each shaft 7 has an arm portion 18 interconnected with the opening 17. The arm portion 18 goes through the opening 17 into the inside of the tube 15. As the tube 15 is rotated the walls of the opening 17 can, in turn, rotate the shaft 7. In the center of the deck 3 there is a cutout 19 through which a bearing support 16 of the lever 14 is extended from the tube 15 to the upper portion of the deck 3. The walls of the cutout 19 retain the support 16 and the tube 15 in their central position relative to the boat's hull 1. As a hydrostabilizer there is a fin 20 fixed in the center of the rear bottom portion of the hull 1.

It has to be understood that the general idea of the invention herein described, and the implementation might be modified in different ways. For example, two motor units might be used with opposite propeller rotation direction to avoid lateral torque.

Figure 6:
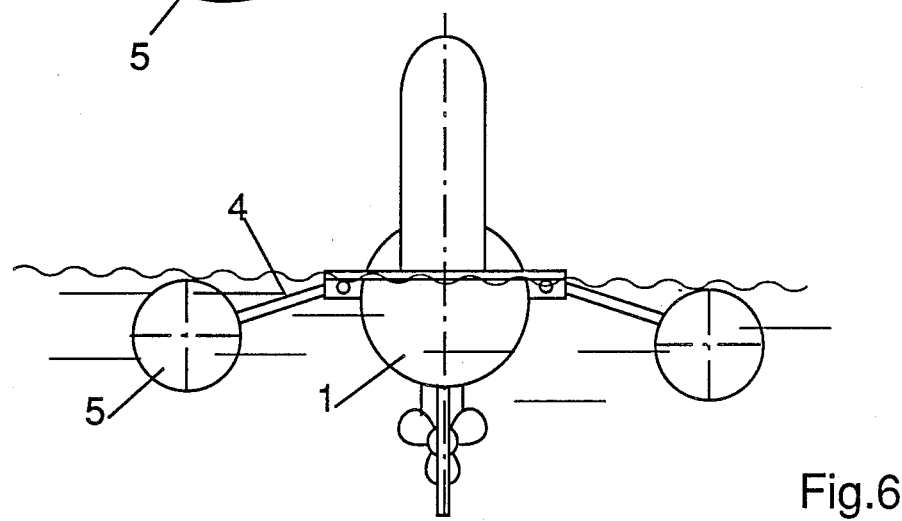
FIG. 6 is a rear view of the boat when at low speed/stopped (floats are in the water)
Figure 9:
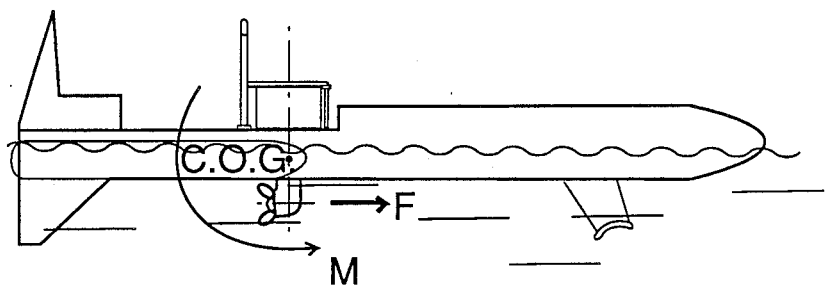
FIG. 9 is a side view of the boat in the position according to FIG. 6.

To use the boat, and operator places himself on a seat 21 located at the rear portion of the boat. When the boat is stopped the steering lever 14 should be tilted into the extreme forward position. This brings the wing-float structures into the position shown on FIG. 6. In this position maximum buoyancy is achieved. As the boat is accelerated water pressure is applied to the hydrofoil and the hull of the boat will become higher. Because of the hydrofoil shape, the front portion of the boat will go into planing much sooner than the rear portion of the boat. The hydroplaning is accelerated by the contribution of the torque M (see FIG. 9) generated by a thrust force F of the propeller, and also of the water pressure created by the propeller against the inclined back wall of the tube 10. It will be a tremendous contribution because the propeller is in line with the center of gravity of the loaded boat.

Figure 8:
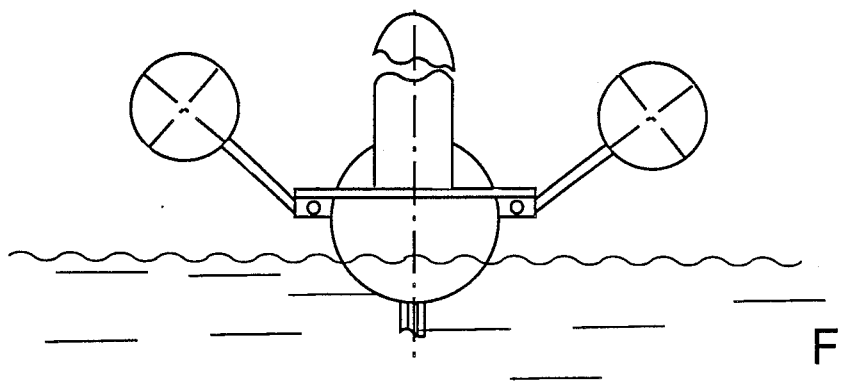
FIG. 8 is a rear view of the boat after it went into hydroplaning but before using a screen-effect (floats are out of the water)

When the speed of the boat and, respectively, the pressure of the water on the hull is high enough to provide buoyancy and stability without the floats they might be raised into the position shown on FIG. 8. To do this an operator should tilt steering lever to the extreme rear of the boat. Now the wing-float structures provide an aerodynamic stabilization to the boat contributing to its balance in a lateral direction. So, on low speed the wing-float structures work as a hydrostabilizer and on high speed as an aerostabilizer.

Figure 7:
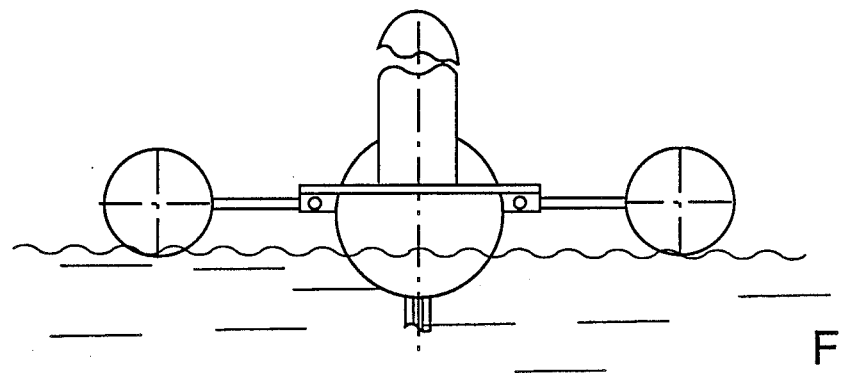
FIG. 7 is a rear view of the boat when at highest speed using screen-effect (wings are in a horizontal position)

With the floats in the upper position the tractive resistance becomes less, and the load speed, respectively, becomes higher. At this stage water pressure is still increasing and at some point it becomes a possibility to utilize air pressure in between the wings and water, in other words, to used the so-called screen-effect. To do this an operator adjust the steering lever forward a little to place the wing-float structures into close-to-horizontal position (see FIG. 7). This adjustment will add lift to the rear portion of the boat. Now almost the whole boat is raised out of the water and the tractive resistance is very small. This helps the boat to generate maximum speed.

Figure 10:
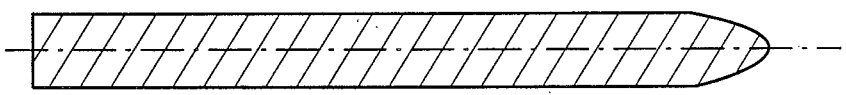
FIG. 10 is a longitudinal section of the boat's hull outlines by a load waterline when the boat is in position according to FIG. 6 and FIG. 9.
Figure 11:
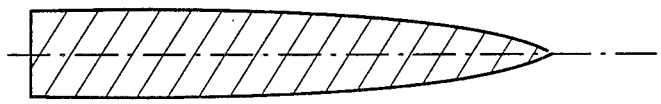
FIG. 11 is the same section as FIG. 10 but when the boat is in position according to FIG. 8.
Figure 12:
FIG. 12 is the same section as FIG. 10 but when the boat is in position according to FIG. 7.

The successive waterlines for the stages described above are shown on FIGS. 10–12. One can see the outline of the sophisticated variable shaped hull laid out in successive order from the top (FIG. 10) to the bottom (FIG. 12).

To steer the boat an operator should rotate the steering lever around its longitudinal axis in a respective direction. The rear fin will hold in place the rear portion of the boat serving like an axis around which the boat will turn being forced by a propeller.

Thus, the complicated hull shape in the boat according to the invention is generated during the acceleration period automatically out of the simple round shape. The operator of the boat can control the dynamic characteristics of the boat choosing the position of the wing-float structures. The airostabilizers do not affect the weight of the boat when it is stopped or at a low speed because at that time they work as floats contributing to the boat buoyancy. The propeller thrust generates a torque which mostly contributes to the boat going into planing because the propeller is in plane line with the boat's center of gravity.

I claim:

1. A planing boat comprising: a tube-like hull means having a rounded nose and a deck portion formed at a top rear section of the hull means, a steerable propeller housing means including an outboard type motor means mounted on the hull means deck portion with an attached propeller means extending downwardly through the hull means, a pair of outboard wing-like plate means with attached wing-float structures hinged to the hull means at each side of the hull means deck portion, steering lever means extending from inside the tube-like hull means upwardly through the deck portion, first means kinematically connecting each said plate means with the steering lever means for lifting and lowering the plate means and attached wing-float structures, and second means kinematically connecting the steering lever means with the propeller housing means for rotating the housing means and attached propeller means around a vertical axis arranged in a plane which is in line with the full-loaded boat center of gravity.

2. A planing boat according to claim 1, wherein said second kinematic connecting means includes a fork fixed to said propeller housing means and an arm connecting said steering lever means to said fork, said propeller housing means further incorporating a gearbox between said motor means and said propeller means.

3. A planing boat according to claim 1, including means for rotatably mounting said tube-like element around a horizontal axis perpendicular to the longitudinal axis of the hull means.

4. A planing boat according to claim 1, wherein said tube-like hull means includes a vertical channel through which the propeller housing means extends with a vertical axis in line with the full-loaded boat center of gravity, said channel comprising a forwardly inclined back wall and vertical side walls which act to seal the hull means.

5. A planing boat according to claim 1, wherein said first kinematic connecting means includes a pair of shafts each respectively connected to one of said plate means, a right angle arm portion extending outwardly from each of said shafts, a tube-like element rotatable about a horizontal axis connected to said steering means, a spiral slot opening means at each end of the tube-like element, and each opening means rotatably receiving and constantly interconnecting one of said right angle arm portions of said shafts.

6. A planing boat according to claim 1, wherein said tube-like hull means has a hydrofoil means fixedly mounted on its front portion and a fin means fixedly mounted on its rear portion.

* * * * *